United States Patent [19]

Heller et al.

[11] 4,127,449

[45] Nov. 28, 1978

[54] LIQUID-SEMICONDUCTOR JUNCTION PHOTOCELLS

[75] Inventors: Adam Heller, Bridgewater; Barry Miller, Murray Hill, both of N.J.

[73] Assignee: Bell Telephone Laboratories, Incorporated, Murray Hill, N.J.

[21] Appl. No.: 739,471

[22] Filed: Nov. 8, 1976

[51] Int. Cl.² .................. H01M 4/04; H01M 6/36
[52] U.S. Cl. .................. 204/2.1; 204/56 R; 204/92; 250/211 J; 250/212; 429/111
[58] Field of Search .................. 136/89 NB; 429/111; 204/56 R, 92, 2.1; 29/572, 623.1, 623.5; 250/211 J, 212

[56] References Cited

U.S. PATENT DOCUMENTS

| | | | |
|---|---|---|---|
| 3,051,636 | 8/1962 | Kaspaul | 204/192 |
| 3,573,177 | 3/1971 | McNeill | 204/32 R |
| 4,011,149 | 3/1977 | Nozik | 204/129 |
| 4,042,758 | 8/1977 | Weinstein et al. | 429/111 |

OTHER PUBLICATIONS

G. Hodes et al., "Photoelectrochemical Energy Conversion and Storage Using Polycrystalline Chalcogenide Electrodes," *Nature*, vol. 261, pp. 403-404, Jun. 1976.

A. B. Ellis et al., "Visible Light to Electrical Energy Conversion."
*J. Am. Chem. Soc.*, vol. 98, pp. 1635-1637, Mar., 1976.
H. Gerischer, "Electrochemical Photo and Solar Cells-Principles and Experiments" *Electroanalytical Chemistry & Interfacial Electrochem*; vol. 58, pp. 263-274, (1975).
K. L. Hardee, "Semiconductor Electrodes-Part I", *J. Electrochem. Soc.*, vol. 122, pp. 739-742 (1975).

*Primary Examiner*—John H. Mack
*Assistant Examiner*—Aaron Weisstuch
*Attorney, Agent, or Firm*—Peter V. D. Wilde

[57] ABSTRACT

Liquid-semiconductor photocells using chalcogenide semiconductors have been advanced recently to the point where they compete favorably with silicon devices for solar power conversion. However, in common with silicon devices, the semiconductor needs to be a single crystal. This fact makes solar power impractically expensive. According to this invention, the chalcogenide semiconductor is made by anodizing cadmium or bismuth in a sulfide, selenide or telluride electrolyte. The anodized element, when operated photovoltaically in an electrolyte similar to the anodizing solution, produces useful power conversion and is relatively inexpensive.

2 Claims, 10 Drawing Figures

LIQUID-SEMICONDUCTOR JUNCTION PHOTOCELLS

BACKGROUND OF THE INVENTION

This invention relates to large area semiconductor junction devices for use as photocells, and as solar cells in particular.

The national concern over energy and energy sources has generated intense interest in the potential of solar power. Conversion of solar energy into electricity is expensive. The conversion devices most often considered are solar batteries, which are semiconductor devices. For conventional electrical applications, such as switching or signal amplification, semiconductor devices are extremely inexpensive because they can be made very small. The cost of semiconductor devices is mainly dependant on the size of the device. Since solar batteries collect light in proportion to the area of the photoresponsive junction, which needs to be relatively large to generate a useful amount of photocurrent, they are costly power generators.

Considerable effort and expense have been devoted to finding ways to reduce the cost of semiconductor solar devices. Much of this has been expended in attempts to make devices in which the semiconductor material is deposited as a polycrystalline thin film on an inexpensive substrate rather than grown by a costly single crystal technique. An example of this approach is described in U.S. Pat. No. 3,953,876 issued Apr. 27, 1976. As in this example, much of the prior effort has been directed to making silicon devices, the most conventional solar cell.

A form of solar cell that has generated enthusiasm recently is the liquid-semiconductor junction solar cell. As implied by the name, the active part of these devices is a junction formed at a semiconductor liquid interface. This kind of device promises to be less expensive to manufacture because it does not require relatively costly epitaxy or diffusion procedures to form the junction, but rather the junction forms spontaneously at the liquid-solid interface. However, the need for a single crystal semiconductor body so far remains.

Significant advances have occurred recently in liquid-semiconductor junction solar cells. These devices were reviewed in a paper written in 1974 by Heinz Gerischer, *Electroanalytical Chemistry and Interfacial Electrochemistry*, 58 (1975), 263–274. His paper deals largely with junctions based on CdS, chosen because of the position of the Fermi level of CdS and because in this kind of cell CdS shows more promise of being photochemically stable than silicon, a material with a more favorable bandgap. Gerischer also considered cells based on CdSe, which has a favorable bandgap, and is potentially more efficient therefore than CdS in terms of solar power conversion. Devices using GaP were also considered but these gave considerably less power. The results reported by Gerischer do not establish the intrinsic merits of these semiconductors in solar devices because they are based on one particular liquid redox system. The choice of the liquid that forms part of the junction determines the photochemistry of the device. Gerischer reported on the ferrocyanide-ferricyanide redox electrolyte which he found to be corrosive to CdS. It is known that this liquid-semiconductor junction is not photochemically stable. Photoexcitation which produces holes at the CdS surface tends to corrode CdS, producing a sulfur layer at the junction interface. This photocorrosion mechanism is manifested by a continuous decay of the photocurrent from the cell with operating time. The reaction is: $CdS + 2h^+ +$ redox electrolyte $\rightarrow S + Cd^{2+}$. The use of a redox couple that functions at a potential higher than this, namely the ferro-ferricyanide couple of Gerischer et al, will also produce a corrosion reaction. The problem of corrosion and consequent passivation of the semiconductor element of the junction is a serious obstacle to practical liquid-semiconductor junction solar cells.

Attempts to repress the corrosion reaction in the presence of other redox couples by increasing $Cd^{2+}$ and S concentration in the liquid electrode are limited in application.

Another semiconductor, n-type $TiO_2$, was found by Fujishima and Honda, *Nature*, 238 (1972) 37, to be electrochemically stable in certain aqueous electrolytes. However, as Gerischer states, "This material is however excluded from a practical application for solar energy conversion by its large bandgap." Moreover, in the system investigated by Fujishima et al, in which the semiconductor is stable, the electrolyte itself is consumed, producing hydrogen, and is therefore not suitable for photoelectric energy conversion. Other semiconductors have been found recently to be appropriately stable in these kinds of cells, but all have large bandgaps.

One way of overcoming the corrosion problem occurs readily to a skilled electrochemist and indeed was proposed to Gerischer in 1966 by G. C. Barker, *J. Electrochem. Society*, 113 (1966) 1182. The solution is to use a polysulfide-sulfide redox couple as the liquid electrode with a CdS solid electrode.

The corrosion reaction: $CdS + 2h^+ \rightarrow Cd^{++} + S$ proceeds at a higher (more anodic) electrode potential than $S^- \rightarrow S + 2e$. Therefore, the sulfur-polysulfide couple (and others with comparable redox potentials) consume the holes responsible for the corrosion reaction before the potential for that reaction is reached. We regard this as a fundamental principle of electrochemistry and have amply demonstrated its effectiveness in liquid chalcogenide semiconductor solar cells. The other chalcogenides, selenide and telluride, follow the same principle, i.e., they are stable in redox electrolytes containing selenide or telluride as the reduced form of the couple. We have found cases (e.g., CdSe in sulfide) of effective operation where the anion of the solid semiconductor and that of the electrolyte do not match, leading to the conclusion that for a given chalcogenide semiconductor the reduced form of the redox couple may be sulfur, selenium or tellurium, or even mixtures of these anions.

The solution of the corrosion problem leaves one major obstacle to practical use of solar batteries as competitive power sources. That obstacle, which was pointed out earlier in connection with solid state junction solar cells, is the cost of single crystal semiconductor material.

Concise Statement of Invention

We have discovered that the semiconductor element for liquid-semiconductor junction photocells can be produced economically by anodizing cadmium or bismuth to form a chalcogenide semiconductor. We have also demonstrated preparation of liquid-CdS and liquid-$Bi_2S_3$ photocells in situ by using sulfide solutions as both the redox couple and the anodizing electrolyte. In either case the semiconductor is polycrystalline and inexpensive to produce.

BRIEF DESCRIPTION OF THE DRAWING

In the drawing:

FIG. 1 shows an idealized plot of semiconductor bandgap vs. energy conversion efficiency, taking the solar spectrum into account. As seen from their position, CdSe, $Bi_2S_3$, and CdTe would have the proper bandgaps for maximum energy conversion efficiency.

Figure 2:
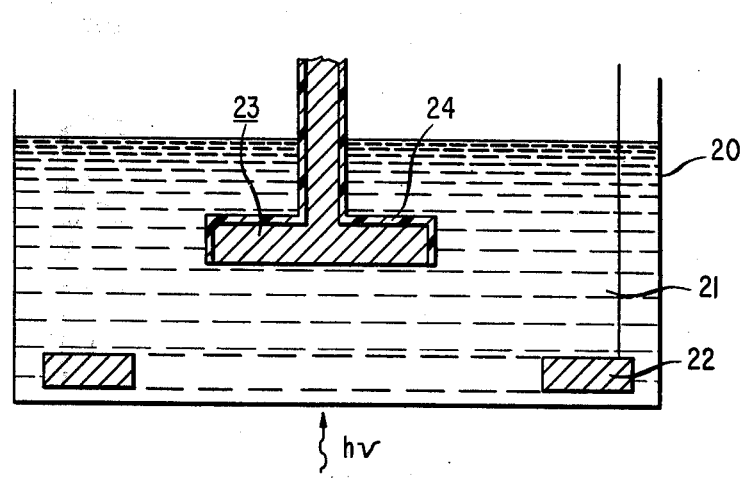
FIG. 2 is a schematic representation of a liquid-semiconductor photocell.
Figure 3A:
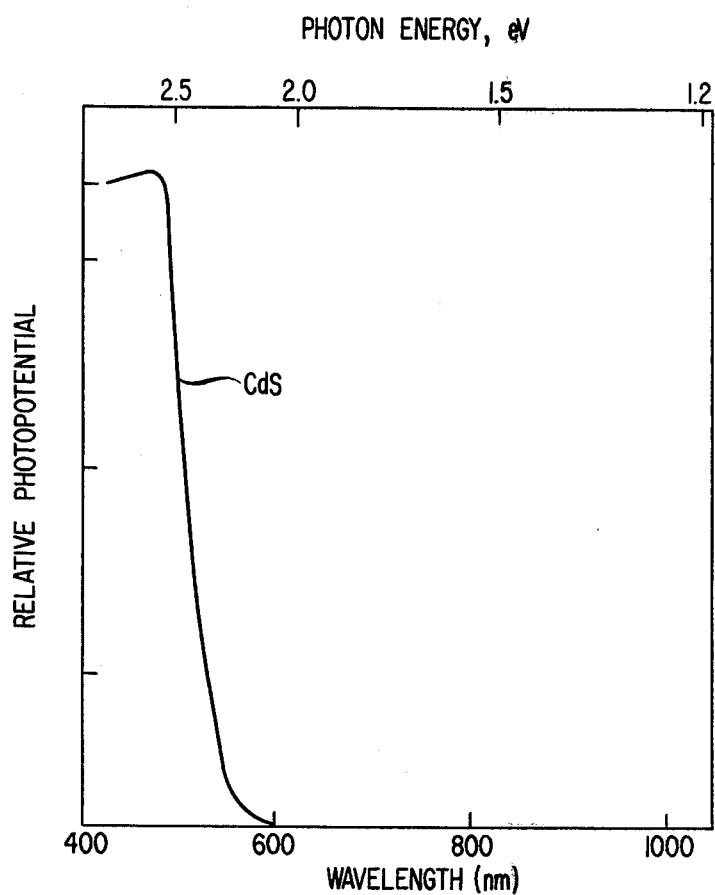
FIGS. 3A to 3E are a series of spectra showing the photoresponse of various photocells made according to the invention.
Figure 3B:
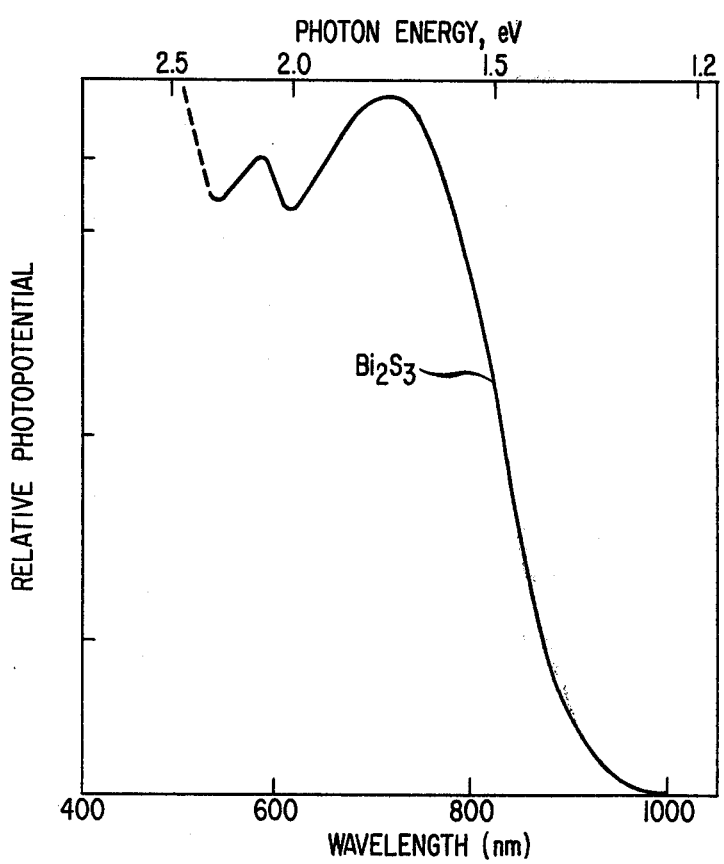
Figure 3C:
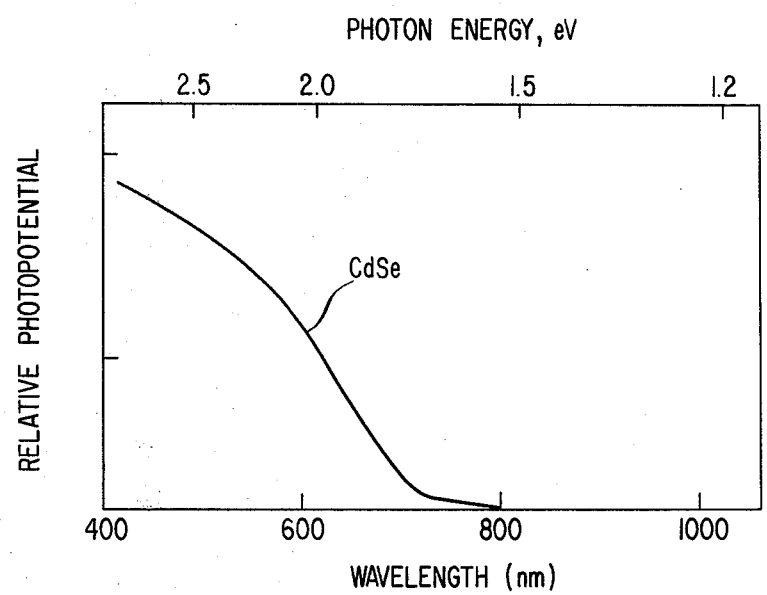
Figure 3D:
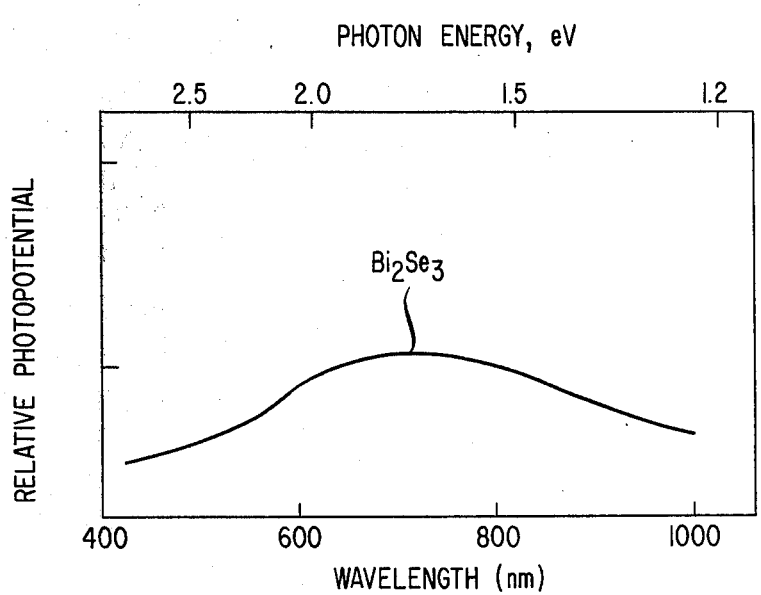
Figure 3E:
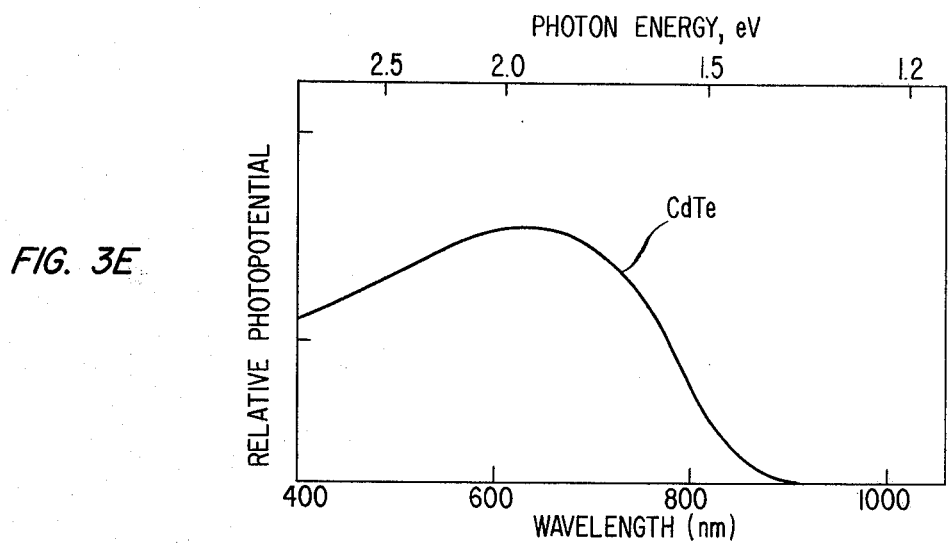
Figure 4:
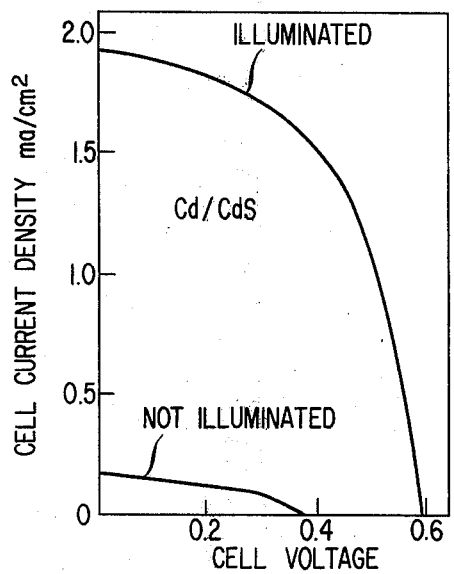
FIG. 4 is a plot of photocurrent vs. voltage for a CdS-liquid photocell made according to the invention.
Figure 5:
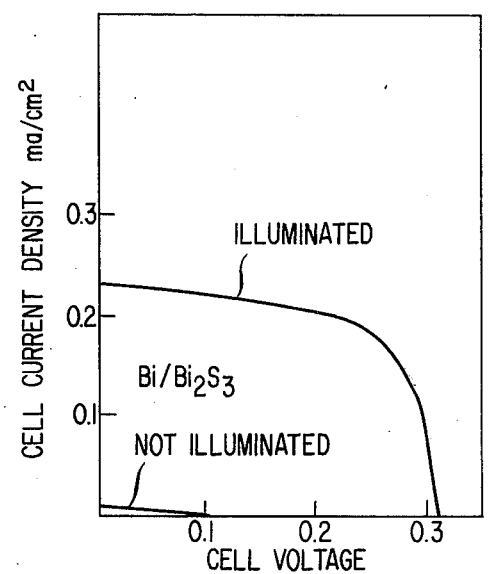
FIG. 5 is a plot similar to that of FIG. 4 for a $Bi_2S_3$-liquid photocell.
Figure 6:
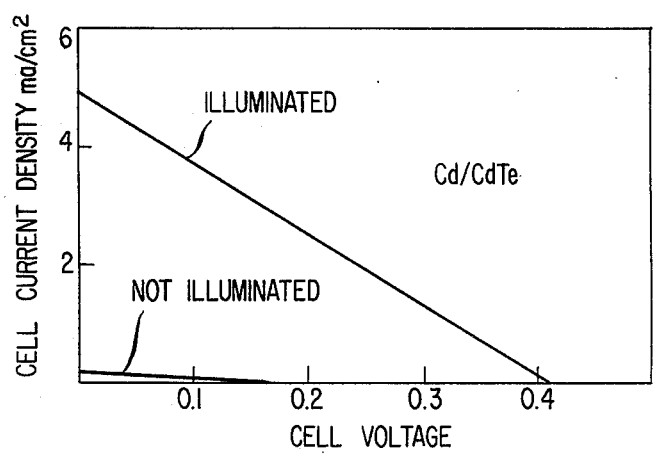
FIG. 6 is a similar plot for a CdSe-liquid photocell.

The spectral data presented in FIGS. 3A to 3E and the electric data given in FIGS. 4-6 was obtained by actual measurement from cells made in accordance with the invention. The cell structure used was similar to that shown schematically in FIG. 2.

Description of Cells and Preparation

The cell structure of FIG. 2 comprises container 20, electrolyte 21, counter electrode 22, which in our devices is a carbon ring, and the active electrode 23. The electrode 23 is insulated with epoxy 24 except where activated and illuminated. The bottom of the container is transparent to pass incident light as shown.

Photocells as just described were made with various anodically formed chalcogenide materials as the active electrode 23.

FIGS. 3A to 3E are plots of actual spectral measurements on cells prepared by the methods described below. The ordinate in each case is the relative photovoltage plotted with the wavelength in nanometers of radiation incident on the photocell as abscissa. The semiconductor electrodes in the cell that produced the data for FIGS. 3A-3E were made by anodizing 10 mil cadmium sheet or cast rods, or bismuth cast from melted shot, in each case of 99.99 percent purity or better. The active surface was defined by potting the superfluous surfaces in epoxy resin as noted before in the description of electrodes 23 (FIG. 2). The anodic chalcogenide surface was formed by anodizing the electrode in a sulfide, selenide or telluride forming solution at a current density of 0.1 to 10 ma/cm² for periods typically of a few minutes to several hours.

To form sulfide chalcogenide semiconductors, a solution containing a total concentration of sulfur in the sulfide oxidation state in a concentration of from 1 millimolar to solubility, and a pH values of 7 to strongly alkaline ($>$ 14) may be used. Examples of such solutions are phosphate buffers of pH 7, carbonate buffers of pH 10, and sodium hydroxide solutions with pH $>$ 14 containing sulfide added as sodium or potassium sulfide or hydrogen sulfide gas. Using cells as in FIG. 2, the cadmium or bismuth electrodes may be anodized at a constant current or constant voltage sufficient to form the sulfide film. The same procedure may be used to produce cadmium or bismuth selenide and cadmium telluride by simply substituting a selenide or telluride source.

Such chalcogenide semiconductors may be transferred to an appropriate redox electrolyte in the same configuration as in FIG. 2 for operation as a solar cell. The exemplary electrical demonstrations represented by the data of FIGS. 3-6 were obtained in sulfide-polysulfide as redox electrolytes. When polysulfide is used for CdS or $Bi_2S_3$ formation, the same cell may serve with those chalcogenide materials both as the medium of formation and of operation. Likewise, the selenides and tellurides may be formed and operated in selenide and telluride solutions respectively. This allows cells of this invention to be manufactured, and even sealed if one desires, and thereafter formed. Cells that fail in operation due to loss of chalcogenide, produced for example by cell reversal under certain conditions, can be regenerated by forming the chalcogenide active material in situ. However, the CdSe cell was demonstrated by transferring it from the selenide forming solution to a sulfide-polysulfide redox cell.

The photoresponse spectra of FIGS. 3A to 3E were obtained by illuminating various anodically coated electrodes with chopped monochromatic radiation obtained with a tungsten (iodine) lamp and a grating monochromator. The electrochemical response was processed with a lock-in amplifier referred to the chopper frequency. A Corning 2-58 filter which cuts off wavelengths below 6300 angstroms was appropriately employed to prevent harmonic responses at the higher wavelengths. The photoresponse spectra were corrected for monochromatic throughput and light source spectrum.

FIGS. 3A and 3B are spectra for a CdS electrode and a $Bi_2S_3$ electrode respectively. Both were formed by anodizing in sulfide solutions as described above. Anodization in every case described herein can be accomplished both galvanostatically and potentiostatically. Electrodes that produce data as in FIGS. 3A and 3B can be formed in 1 m NaOH, 0.1 M $Na_2S$ solution by anodizing at 1 ma/cm² for 1 hour.

The spectra shown in FIGS. 3C and 3D were obtained with a CdSe electrode and a $Bi_2Se_3$ electrode respectively. Both can be formed by anodizing in a solution containing 1 M NaOH and 10 mM $Na_2Se$, at a current density of 1 ma/cm² for 1 hour.

The spectrum shown in FIG. 3E can be obtained with a CdTe electrode made by anodizing a cadmium sheet in a solution containing 1 M NaOH and 5 mM $Na_2Te$ at a current density of 1 ma/cm² for 1 hour.

The anodizing solutions seem to be effective with concentrations of $S^-$, $Se^-$ and $Te^-$ of approximately 1 mM to solubility.

Photocurrent produced by various cells with anodically formed electrodes as just described is plotted in FIGS. 4-6 vs. cell voltage. The level of illumination was equivalent to 0.1-5 suns under Air Mass 2 conditions.

Figure 1:
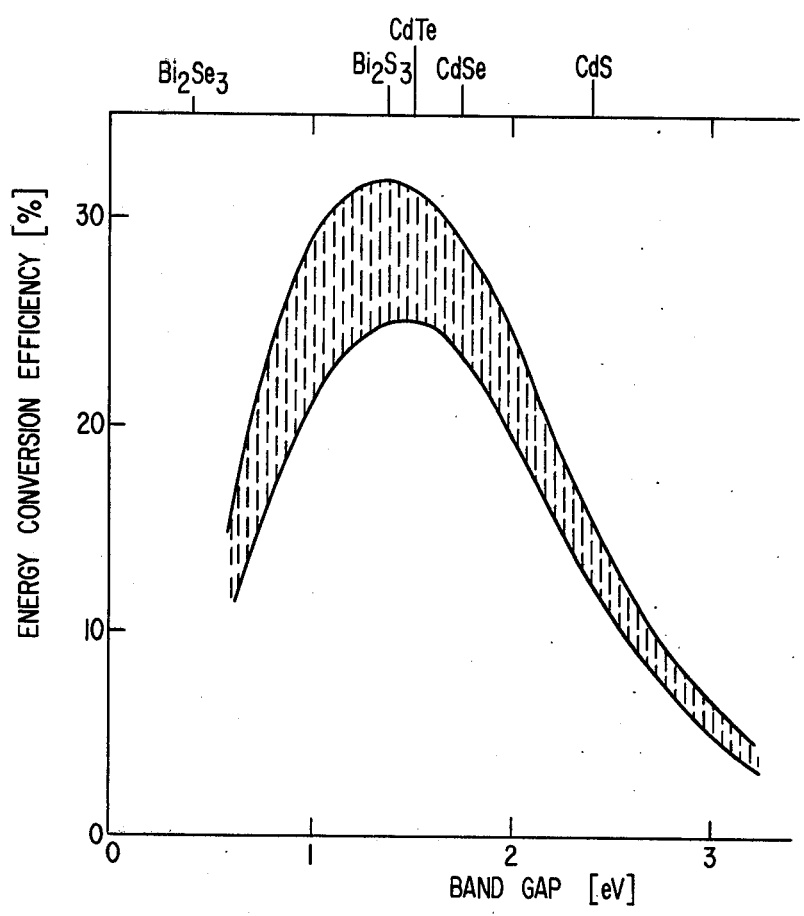
FIG. 1 is a plot of the theoretical energy conversion efficiency for various semiconductors based on their bandgap.

Although we have chosen to demonstrate the effectiveness of anodically formed elements of the semiconductors described, it is clear that equivalent results can be obtained with any chalcogenide semiconductor. For example, ZnO, ZnS, ZnSe are well-known photoelectric materials that are obvious candidates for the photocells of this invention although their bandgaps make it unlikely that they will be used as solar cells. Cadmium, bismuth and zinc telluride are also potentially useful. It is evident from FIG. 1 that CdTe is a preferred candidate. The object of our demonstration was to establish that chalcogenide semiconductors, as a class, can be prepared by anodization to function in semiconductor-liquid junction photocells.

As the development of these devices proceeds, it will be interesting to look for optimum combinations not only of the solid and liquid components of the junction, but of mixed chalcogenides in the solid and mixed anions in the liquid. Mixtures of these with other additives to change the electrode conductivity, to combat polarization or corrosion effects, or for reasons yet unseen may also become important.

These and other modifications and extensions of this invention will become apparent to those skilled in the art. All such variations and deviations which basically rely on the teachings through which this invention has advanced the art are properly considered to be within the spirit and scope of this invention.

What is claimed is:

1. A method for making a photocell comprising: assembling together a cadmium or bismuth metal electrode, a counter electrode and an electrolyte as an electrolytic cell, the electrolyte comprising an anion selected from the group consisting of sulfide, selenide, telluride and mixtures thereof, and anodizing the metal electrode by application of an externally generated current to form an anodic chalcogenide coating to form in situ a liquid-semiconductor junction photovoltaic cell.

2. The method of claim 1 including the further step of reactivating the chalcogenide coating after photovoltaic use by reanodizing the cadmium or bismuth electrode.

* * * * *